United States Patent
Imai et al.

(10) Patent No.: US 7,936,883 B2
(45) Date of Patent: May 3, 2011

(54) QUANTUM KEY DISTRIBUTION PROTOCOL (75) Inventors: Hideki Imai, Yokohama (JP); Manabu Hagiwara, Ichikawa (JP); Makoto Eguchi, Taki-gun (JP)

(73) Assignee: The Foundation for the Promotion of Industrial Science, Tokyo (JP)

( * ) Notice: Subject to any disclaimer, the term of this patent is extended or adjusted under 35 U.S.C. 154(b) by 1012 days.

(21) Appl. No.: 11/661,507

(22) PCT Filed: Aug. 30, 2005

(86) PCT No.: PCT/JP2005/015802
§ 371 (c)(1),
(2), (4) Date: Feb. 26, 2007

(87) PCT Pub. No.: WO2006/025410
PCT Pub. Date: Mar. 9, 2006

(65) Prior Publication Data
US 2008/0101612 A1    May 1, 2008

(30) Foreign Application Priority Data

Aug. 31, 2004 (JP) ................................ 2004-253266

(51) Int. Cl.
*H04L 9/08* (2006.01)
(52) U.S. Cl. ........ 380/283; 380/201; 380/255; 380/277; 380/278
(58) Field of Classification Search .................. 380/283, 380/201, 255, 277, 278
See application file for complete search history.

(56) References Cited

U.S. PATENT DOCUMENTS
6,775,706 B1 * 8/2004 Fukumoto et al. ............ 709/230

OTHER PUBLICATIONS

Valerio Scarani1, Antonio Acín, Grégoire Ribordy, and Nicolas Gisin, "Quantum Cryptography Protocols Robust against Photon Number Splitting Attacks for Weak Laser Pulse Implementations", Physical Review Letters, vol. 92, No. 5, Feb. 2004.*

Nicolas Gisin, Nicolas Brunner, "Quantum cryptography with and without entanglement", arxiv:quant-ph/0312011 v1 Dec. 2003.*

C. H. Bennett and G. Brassard, "Quantum Cryptography: Public Key Distribution and Coin Tossing". Proceedings of IEEE Conference on Computers, Systems and Signal Processing, pp. 175-179, 1984.

V. Scarani, A. Acin, G. Ribordy, and N. Gisin, "Quantum Cryptography Protocol Robust against Photon Number Splitting Attacks for Weak Laser Pulse Implementations", Physical Review Letters, vol. 92, No. 5, 2004.

Charles H. Bennett, Gilles Brassard, Claude Crepeau, and Ueli M. Maurer, "Generalized Privacy Amplification," IEEE Transaction on Information Theory, vol. 41, No. 6, pp. 1915-1923, Nov. 1995.

(Continued)

*Primary Examiner* — Matthew T Henning
*Assistant Examiner* — Gary Gracia
(74) *Attorney, Agent, or Firm* — Kenyon & Kenyon, LLP (57) ABSTRACT

A quantum key distribution protocol is provided that reduces the maximum value of the leaked information amount over the same distance when an adversary makes a photon number splitting attack more than the reduction by the BB84 protocol and the SARG protocol, by making use of the advantages of the BB84 protocol and the SARG protocol. By properly proportioning the existing BB84 protocol and the SARG protocol in accordance with the rate determined by the communication distance between the sender and the receiver of the coherent light, a protocol that is more robust against photon number splitting attack than the known existing protocols can be realized, and long distance quantum key distribution, which was not possible until now, becomes possible.

10 Claims, 7 Drawing Sheets

OTHER PUBLICATIONS

C. Uchiyama, "Ryoshi Rikigaku no Kiso to Ryoshi Ango Ryoshi Channel no Shiten", Suri Kagaku, vol. 34, No. 12, No. 402, Dec. 1, 1996, pp. 53-61.

Especially Approved Corporation Information Technology Promotion Agency,"2.2.2. Ryoshi Ango Protocol", Tyoshi Kansuru Chosa, Mar. 2002, pp. 17-33.

E. Makoto, H. Manabu, H. Imai, An Evaluation of Robustness of Quantum Key Distribution Protocols against Photon Number Splitting Attacks, Computer Security Symposium 2004, vol. II of II, pp. 541-546.

E. Makoto, H. Manabu, H. Imai, On a Comparison among Quantum Key Distribution Protocols about a Robustness against Photon Number Splitting Attacks and an Information on Classical Communication, Proceedings of the $27^{th}$ Symposium on information Theory and Its Applications (SITA 2004), vol. II of II, Dec. 14-17, 2004, pp. 771-774.

* cited by examiner

QUANTUM KEY DISTRIBUTION PROTOCOL

TECHNICAL FIELD

The present invention relates to quantum key distribution protocol (which distributes secret key using quantum cryptography), and relates particularly to quantum key distribution protocol used when quantum key distribution is implemented using weak coherent light.

Priority is claimed on Japanese Patent Application No. 2004-253266, filed on Aug. 31, 2004, the content of which is incorporated herein by reference.

BACKGROUND ART

Quantum key distribution has been implemented since the past using coherent light with aligned wavelength and phase and possessing coherence, such as a laser beam. When quantum key distribution is implemented with weak coherent light, multiple photons are generated at a high probability that cannot be ignored. When quantum key distribution is thus implemented with weak coherent light, the photon detection probability by a photon detector is directly proportional to the number of photons, and inversely proportional to the photon loss rate of the channel. Moreover, the photon loss rate is directly exponential to the distance. In the descriptions hereafter, the sender of the weak coherent light is referred to as Alice, while the receiver is referred to as Bob.

Photon number splitting attack is an attack that is possible in principle when multiple photons are generated. For instance, photon number splitting attack is described as "storage attack" and "intercept-resend with unambiguous discrimination attack" in the non-patent document 1 below. "Storage attack" is an attack wherein some of the photons are separated from the pulse that includes multiple photons, and are stored in quantum memory, the remaining photons are sent to Bob through the lossless channel, and the photons stored in the quantum memory are appropriately observed to obtain secret key information from the subsequent transmission contents between Bob and Alice. The "intercept-resend with unambiguous discrimination attack" refers to an attack wherein the probabilities of respective quantum states can be judged with certainty by simultaneously measuring multiple photons from a pulse that includes the multiple photons; a new quantum state is generated when this judgment is made, and the new quantum state is sent to Bob through the lossless channel.

When photon number splitting attack is made, the photon detection probability by the photon detector is directly proportional to the number of photons sent by the adversary to Bob. At this stage, that adversary can successfully perform attacks without detection thereof by controlling the frequency of the attacks such that the photon detection probability becomes the same as when there is no attack. Especially, during quantum key distribution over large distances, the photon loss rate of the channel becomes high, and the photon detection probability becomes low. As a result, the frequency of attacks by the adversary increases, and the mutual information amount (that is, the leaked information amount) of the key leaked to the adversary increases.

To resolve the problem of vulnerability to storage attack of the BB84 protocol proposed in non-patent document 1, the SARG protocol has been proposed in non-patent document 2. The transmission content of the classic channel and the key sifting method differ in the BB84 protocol and the SARG protocol. The key generation efficiency per pulse of the SARG protocol is only half that of the BB84 protocol. Therefore, the intensity of coherent light is doubled (that is, the average photon number per pulse is doubled) to make the key generation efficiency the same as that of the BB84 protocol in order to implement the SARG protocol with weak coherent light. Even so, it was demonstrated that the SARG protocol was more robust against storage attacks than the BB84 protocol. The problem of limitation in the distance over which secure transmission can be carried out is well known when both these protocols are used. For instance, when BB84 protocol and SARG protocol were used, and when the communication distances were equal to or greater than 50 km and equal to or greater than 100 km respectively, it was demonstrated in the non-patent document 2 that secure transmissions could not be carried out.

Non-patent document 1: C. H. Bennett and G. Brassard, "Quantum Cryptography: Public Key Distribution and Coin Tossing", Proceedings of IEEE Conference on Computers, Systems and Signal Processing, pp. 175-179, 1984

Non-patent document 2: V. Scarani, A. Acin, G. Ribordy, and N. Gisin, "Quantum Cryptography Protocol Robust against Photon Number Splitting Attacks for Weak Laser Pulse Implementations", Physical Review Letters, vol. 92, no. 5, 2004

Non-patent document 3: Charles H. Bennett, Gilles Brassard, Claude Crepeau, and Ueli M. Maurer, "Generalized Privacy Amplification", IEEE Transaction on Information Theory, vol. 41, no. 6, pp. 1915-1923, November 1995

DISCLOSURE OF INVENTION

Problem to be Solved by the Invention

However, assuming that the adversary only performs an intercept-resend with unambiguous discrimination attack, the SARG protocol becomes more vulnerable than the BB84 protocol due to a high intensity of coherent light. That is, as the intensity of weak coherent light increases, the generation efficiency of multiple photons increases, and the number of photons sent by the adversary to Bob increases. Accordingly, when a photon number splitting attack is carried out, the frequency of attacks by the adversary increases, and the amount of mutual information of key leaked to the adversary (that is, the leaked information amount) increases.

The present invention has been made in view of the foregoing problems, and an object of the present invention is to provide a quantum key distribution protocol that makes use of the advantages of the BB84 protocol and the SARG protocol, and reduces the maximum value of leaked information amount as small as possible with respect to the BB84 protocol and the SARG protocol over the same distance when an adversary carries out a photon number splitting attack.

Means for Solving the Problems

The quantum key distribution protocol according to the present invention is a quantum key distribution protocol used in a quantum key distribution system implemented by using a pulse of weak coherent light, comprising determining a usage rate of two kinds of existing protocols in accordance with a communication distance between a sender and a receiver of the weak coherent light.

In the quantum key distribution protocol according to the present invention, it is preferable that the two kinds of existing protocols be the BB84 protocol vulnerable to storage attacks, and the SARG protocol vulnerable to intercept-resend with unambiguous discrimination attacks.

In the quantum key distribution protocol according to the present invention, it is preferable that the usage rate of the two kinds of existing protocols be determined in accordance with the communication distance such that the quantum key distribution protocol becomes more robust against the storage attacks than the BB84 protocol and more robust against the intercept-resend with unambiguous discrimination attacks than the SARG protocol.

In the quantum key distribution protocol according to the present invention, it is preferable that if an average number of photons in the pulse of the weak coherent light when the BB84 protocol is used independently is taken as $\mu$, and if an average number of photons in the pulse of the weak coherent light when the SARG protocol is used independently is taken as $2\mu$, and if the minimum distance at which a mutual information amount that can be acquired by an eavesdropper reduces more than when the BB84 protocol and the SARG protocol are each used independently is taken as m, and if the maximum distance at which the mutual information amount that can be acquired by the eavesdropper becomes less than 1 is taken as M, and if the communication distance is taken as L, L being a value between m and M, the usage rate a of the BB84 protocol and the SARG protocol be determined as $a \leq (L-m)/(M-m)$, a being a value other than 0 and 1, and the average number of photons be determined as $\mu \times 2/(1+a)$. With the above conditions, the secret key generation efficiency can be improved better than the corresponding improvement by either the BB84 protocol or by the SARG protocol.

In this case, if the average number of photons in the pulse of the weak coherent light when the BB84 protocol is independently used is 0.1 [photon/pulse], and if the average number of photons in the pulse of the weak coherent light when the SARG protocol is independently used is 0.2 [photon/pulse], and if M=125 km and m=87.5 km, the usage rate a is determined as $a \leq (L-87.5)/(125-87.5)$, a being a value other than 0 and 1 and L being a value between 87.5 km and 125 km, and the average number of photons is determined as $0.2/(1+a)$.

In the quantum key distribution protocol according to the present invention, it is preferable that if an average number of photons in the pulse of the weak coherent light when the BB84 protocol is used independently is taken as $\mu$, and if an average number of photons in the pulse of the weak coherent light when the SARG protocol is used independently is taken as $2\mu$, and if the minimum distance at which a mutual information amount that can be acquired by an eavesdropper reduces more than when the BB84 protocol and the SARG protocol are each used independently is taken as m, and if the maximum distance at which the mutual information amount that can be acquired by the eavesdropper becomes less than 1 is taken as M, and if the maximum distance at which the mutual information amount that can be acquired by the eavesdropper becomes less than 1 when the BB84 protocol and the SARG protocol are each used independently is taken as n, and if the communication distance is taken as L, L being a value between n and M, the usage rate a of the BB84 protocol and the SARG protocol be determined as $a \leq (L-m)/(M-m)$, a being a value other than 0 and 1, and the average number of photons be determined as $\mu \times 2/(1+a)$. This makes it possible to communicate securely beyond a distance n, which was not possible when the BB84 protocol and the SARG protocol were independently used. Moreover, as mentioned above, the secret key generation efficiency can be increased better than when each of the BB84 protocol and the SARG protocol is used.

In this case, if the average number of photons in the pulse of the weak coherent light when the BB84 protocol is independently used is 0.1 [photon/pulse], and if the average number of photons in the pulse of the weak coherent light when the SARG protocol is independently used is 0.2 [photon/pulse], and if M=125 km, m=87.5 km, and n=100 km, the usage rate a is determined as $a \leq (L-87.5)/(125-87.5)$, a being a value other than 0 and 1 and L being a value between 100 and 125 km, and the average number of photons is determined as $0.2/(1+a)$.

The communication method of the present invention for sharing a secret key between a sender and a receiver performing quantum key distribution comprising: the step in which the sender selects a quantum state of weak coherent light at random from quantum states used in two kinds of existing protocols; the step in which the sender sends to the receiver the weak coherent light having the selected quantum state through a quantum channel; the step in which the receiver observes the quantum state of the weak coherent light using any of bases used in the two kinds of existing protocols; the step in which the sender generates a random number that takes a first value indicating the use of one of the two kinds of existing protocols or a second value indicating the use of the other protocol of the two kinds of existing protocols; the step in which the sender sends to the receiver classical information in accordance with the one of the protocols through a classical channel if the random number is the first value, or sends to the receiver classical information in accordance with the other protocol through the classical channel if the random number is the second value; the step in which the receiver makes a decision as to which of the two kinds of existing protocols the classical information sent by the sender is based on, and judges the quantum state of the weak coherent light received from the sender in accordance with the decided protocol; the step in which the sender and the receiver discard the quantum state if the judgment cannot be made; and the step in which if the judgment can be made, the receiver and the sender share the secret key, and the receiver and the sender correlate the judged quantum state and classical information in accordance with the decided protocol.

Effect of the Invention

According to the quantum key distribution protocol of the present invention, a quantum key distribution system that is more secure than those using existing protocols independently with weak coherent light can be constructed, and the security limits of communication distance of quantum key distribution using weak coherent light can be extended further. Moreover, the mutual information amount (leaked information amount) related to secret key leaked to the adversary during a photon number splitting attack can be reduced than those using the existing protocols independently. Furthermore, the quantum key distribution protocol of the present invention can be easily realized by using the existing quantum key distribution systems without waiting for new technologies in physics.

EXPLANATION OF REFERENCE NUMERALS

1 Beam splitter
2 Phase modulator
3 Balanced photodiode
4 Laser beam generator
5 Faraday mirror
6 Optical transceiver for synchronization
7 Optical injector/distributor for synchronization
8 Attenuator
9 Optical circulator
10 Core coupler
11 Electronic control circuit on Alice's side
12 Electronic control circuit on Bob's side
13 Computer on Alice's side
14 Computer on Bob's side
15 Random number generator

BEST MODE FOR CARRYING OUT THE INVENTION

Outline of the Invention

Multiple photons are generated at a probability that cannot be ignored when quantum states are implemented by weak coherent light pulses in quantum key distribution protocol (that distributes a secret key using quantum cryptography). It is also well known that an attack called the photon number splitting attack can be theoretically made by combining with the losses of photons in long distance communications. As a result, eavesdropping of the secret key becomes possible, and the problem of inability to distribute quantum key securely over long distance communications arises. To resolve this problem, the quantum key distribution protocol of the present invention makes proper use of the existing BB84 protocol and the existing SARG protocol in accordance with specific proportions corresponding to the communication distance. As a result, a protocol more robust against photon number splitting attacks can be realized than the known existing protocols (that is, BB84 protocol and SARG protocol) until now. Thus, long distance quantum key distribution, which was not possible until now, can be realized. Moreover, the usage rate a that makes proper use of the two protocols is provided as $a \leq (L-87.5)/(125-87.5)$ if for instance the average number of photons used in the BB84 protocol independently is 0.1 [photon/pulse] (the average number of photons is equivalent to 0.2 [photon/pulse] used in the SARG protocol independently), and the communication distance is L (>87.5 km). The average number of photons used at this stage is provided as $0.2/(1+a)$. The SARG protocol is the same as when $a=0$, while the BB84 protocol is the same when $a=1$. Moreover, when the communication distance is equal to or less than 87.5 km, the usage rate a is provided as 0.

That is, by random use of the BB84 protocol and the SARG protocol in the present invention, a quantum key distribution protocol that is more robust against "storage attacks" than the BB84 protocol and more robust against "intercept-resend with unambiguous discrimination attacks" than the SARG protocol has been realized. As a result, when long distance quantum key distribution with weak coherent light is implemented, and when an adversary has made a photon number splitting attack, the maximum value of leaked information amount at the same distance can be restricted to a smaller value than those of the BB84 protocol and the SARG protocol.

Embodiments

The embodiments of the quantum key distribution protocol of the present invention are described below in detail referring to the drawings.

First, the quantum states used in the protocol of the present invention are defined below.

(Equation 1) are made available as the quantum states. Here, (Equation 2) belong to base A, while (Equation 3) belongs to base B. (Equation 5) is satisfied where (Equation 4) while (Equation 7) is satisfied where (Equation 6). Furthermore, if each quantum state is expressed by classical information, each quantum state corresponds to classical information (Equation 8) given below.

The a-random number generator used in the functions of the quantum key distribution protocol of the present invention is defined as below.

The a-random number generator outputs "0" at the probability a, and outputs "1" at probability 1–a when an output request is received for $0 \leq a \leq 1$.

Figure 1:
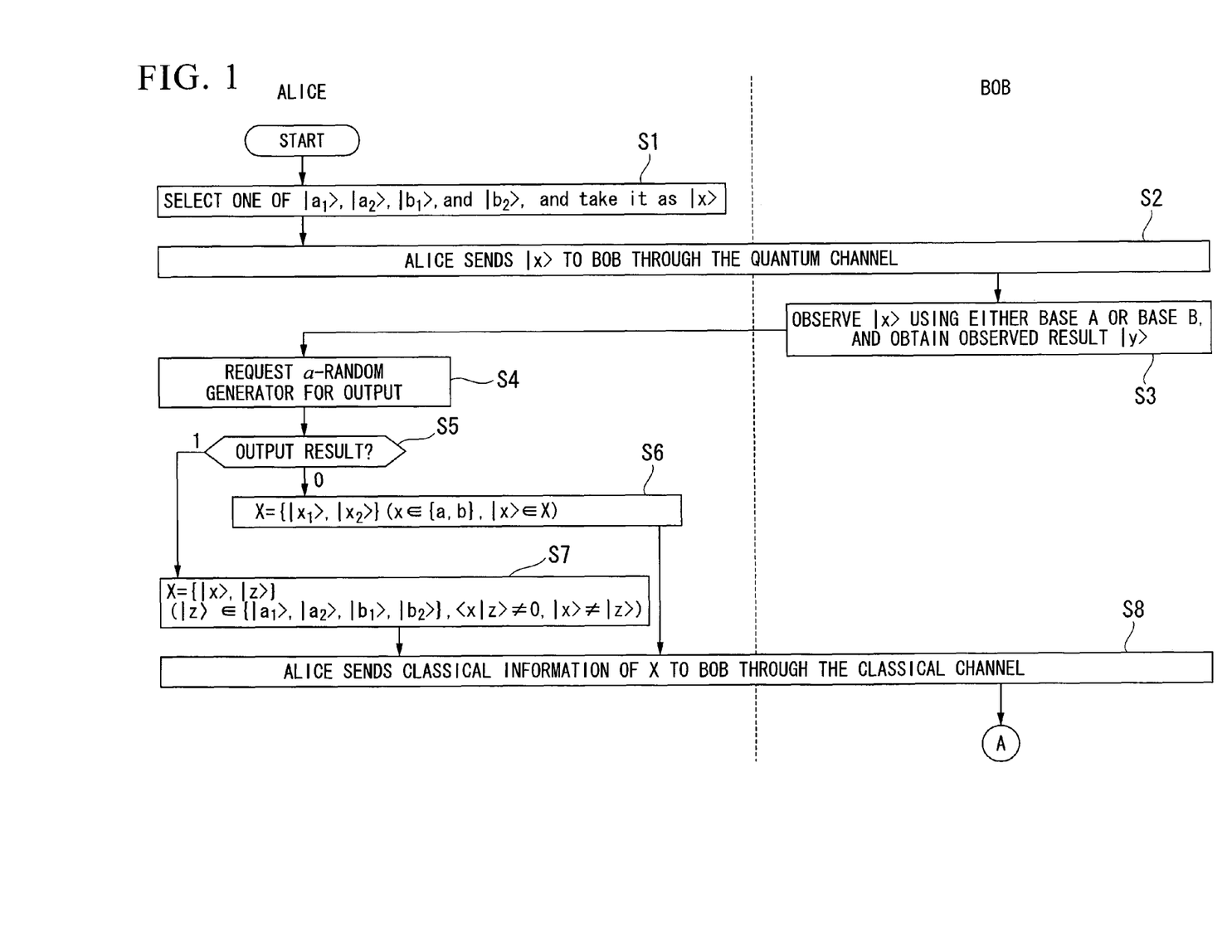
FIG. 1 shows the flow chart of the implementation of the quantum key distribution protocol in the embodiment of the present invention.
Figure 2:
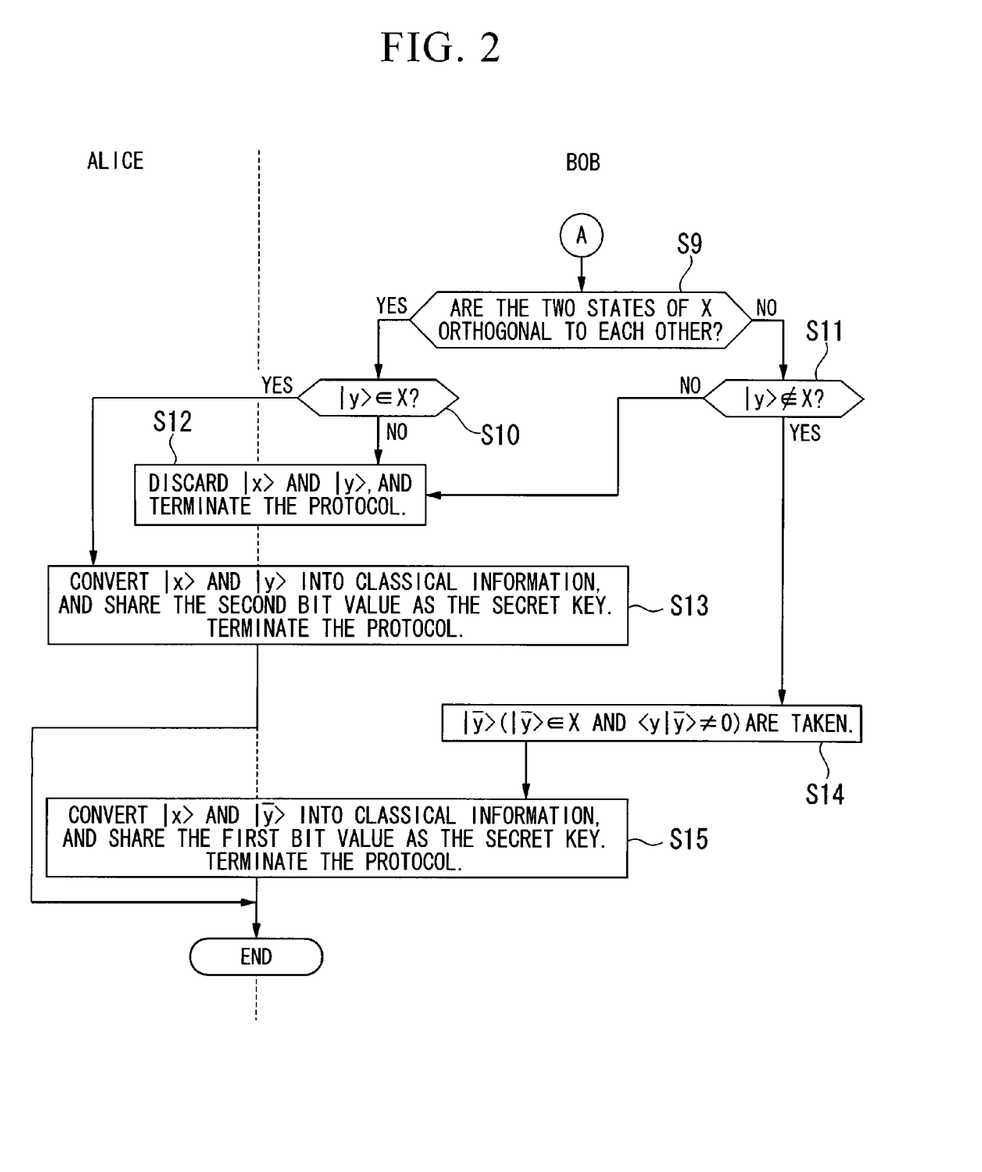
FIG. 2 is a continuation of the flow chart of FIG. 1.

Next, the flow of execution of the quantum key distribution protocol in the present invention is described using a flow chart. FIG. 1 shows the flow chart of the implementation of the quantum key distribution protocol in the embodiment of the present invention, while FIG. 2 is a continuation of the flow chart of FIG. 1. These flow charts show the flow of data exchanged between Alice (sender) and Bob (receiver), who send and receive weak coherent light.

First, in the flow chart of FIG. 1, Alice selects one quantum state from the quantum states (Equation 1) of weak coherent light and takes it as (Equation 9) (step S1). Next, Alice sends (Equation 9) to Bob through the quantum channel (step S2). Bob uses either base A or base B to observe (Equation 9), and obtains the observation result (Equation 10) (step S3). Then Bob requests Alice for the output of the a-random generator (step S4). Alice judges the output result of the a-random generator (step S5). If the output result is "0," Alice takes it as (Equation 11), similar to the BB84 protocol (step S6). That is, either base A or base B including the quantum state (Equation 9) selected by Alice at step S1 is taken as base X. If the output result is "1," it is taken as (Equation 12), similar to the SARG protocol (step S7). That is, either the quantum state (Equation 9) selected by Alice in step S1 or one of the quantum state (Equation 1) that is not orthogonal to (Equation 9) is taken as the quantum state X. Next, Alice sends to Bob the classical information of the output result X of step S6 or step S7 through the classic channel (step S8).

Next, as shown in the flow chart in FIG. 2, Bob judges whether the two states of the output result X are mutually orthogonal or not (step S9). If the two states of the output result X are mutually orthogonal (Yes in step S9), then the subsequent processing will be similar to the one for the BB84 protocol. That is, Bob judges whether (Equation 13) is satisfied or not (step S10). On the other hand, if the two states of the output result X are not mutually orthogonal (No in step S9), the subsequent processing will be similar to the one for the SARG protocol. That is, Bob judges whether (Equation 14) is satisfied or not (step S11).

Here, if (Equation 13) is not satisfied in step S10 (No in step S10), then the quantum state sent by Alice in step S2 cannot be identified correctly, therefore, (Equation 9) and (Equation 10) are discarded, and the protocol is terminated (step S12). On the other hand, if (Equation 13) is satisfied in step S10 (Yes in step S10), (Equation 9) and (Equation 10) are converted into classical information, the value of the second bit is shared as the secret key, and the protocol is terminated (step S13). As mentioned above, if each quantum state is expressed as 2-bit classical information, the first bit indicates which of the base A or the base B is used as a base, while the second bit indicates which of the two quantum states belonging to each base is used as a quantum state. Whether the base belonging to the quantum state sent to Bob in step S2 is base A or base B is sent (i.e., publicly announced) to Bob by the processing of step S6 and step S8. However, which of the quantum states from those belonging to the base has been selected in step S1 has not been publicly announced, so the information of the second bit corresponding to this is used as the secret key.

In step S11, if the result of the judgment by Bob indicates that (Equation 14) is not satisfied (No in step S11), then the quantum state sent by Alice in step S2 cannot be identified correctly, and thus (Equation 9) and (Equation 10) are discarded, and the protocol is terminated (step S12). On the other hand, if the result of the judgment by Bob in step S11 indicates that (Equation 14) is satisfied (Yes in step S11), then (Equation 15) is taken (step S14). That is, similar to the case of SARG protocol, in the two quantum states included in the output result X, the quantum state that becomes the orthogonal state for the observed result (Equation 10) coincides with the quantum state selected in step S1, therefore this is taken as (Equation 16). Then (Equation 9) and (Equation 16) are converted into classical information, the first bit value is shared as the secret key, and the protocol is terminated (step S15). The classical information of output result X including the quantum state (Equation 9) sent to Bob in step S2 and the quantum state belonging to a base different from the base to which this quantum state belongs are sent (publicly announced) to Bob by the processes in steps S7 and S8. However, whether the quantum state sent to Bob in step S2 belongs to base A or base B has not been publicly announced, therefore, the first bit of information that corresponds to this is used as the secret key.

$|a_1\rangle, |a_2\rangle, |b_1\rangle, |b_2\rangle$ (Equation 1)

$|a_1\rangle, |a_2\rangle$ (Equation 2)

$|b_1\rangle, |b_2\rangle$ (Equation 3)

$i, j \in \{1, 2\}$ (Equation 4)

$\langle a_i | b_j \rangle \neq 0$ (Equation 5)

$k \in \{a, b\}$ (Equation 6)

$\langle k_1 | k_2 \rangle = 0$ (Equation 7)

$|a_1\rangle \Leftrightarrow 00, |a_2\rangle \Leftrightarrow 01, |b_1\rangle \Leftrightarrow 10, |b_2\rangle \Leftrightarrow 11$ (Equation 8)

$|x\rangle$ (Equation 9)

$|y\rangle$ (Equation 10)

$X = \{|x_1\rangle, |x_2\rangle\} (x \in \{a, b\}, |x\rangle \in X)$ (Equation 11)

$X = \{|x\rangle, |z\rangle\} (|z\rangle \in \{|a_1\rangle, |a_2\rangle, |b_1\rangle, |b_2\rangle\}, \langle x|z\rangle \neq 0, |x\rangle \neq |z\rangle)$ (Equation 12)

$|y\rangle \in X$ (Equation 13)

$|y\rangle \notin X$ (Equation 14)

$|\bar{y}\rangle (|\bar{y}\rangle \in X, \langle y|\bar{y}\rangle \neq 0$ (Equation 15)

$|\bar{y}\rangle$ (Equation 16)

Figure 3:
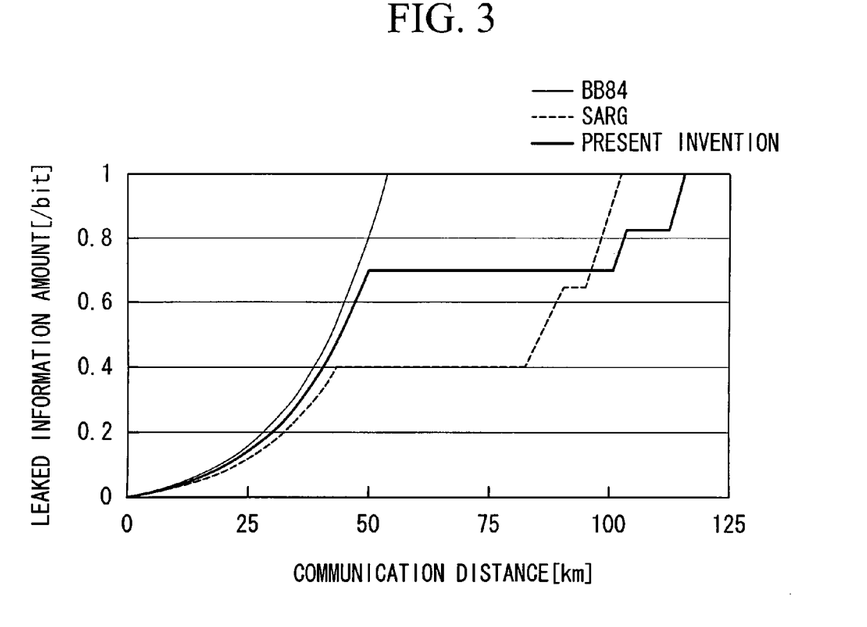
FIG. 3 shows the characteristics comparing robustness to photon number splitting attacks between the present invention and those of publicly known technology.

FIG. 3 shows the characteristics comparing robustness of the present invention and that of publicly known technology against photon number splitting attacks. That is, this figure is a graph expressing the robustness to photon number splitting attack when the usage rate a=0.5 in the publicly known technology and in the present invention. The horizontal axis in the figure expresses the communication distance [km] between Alice and Bob; the vertical axis expresses the mutual information amount [/bit] related to the secret key that the adversary possesses (that is, leaked information amount). The parameters of the graph are (a) BB84 protocol, (b) SARG protocol, and (c) the protocol of the present invention.

The attenuation rate of the optical fiber for communication between Alice and Bob is taken as 0.25 [dB/km], the average number of photons per pulse in the BB84 protocol is taken as 0.1 [photon/pulse] (equivalent to the average number of photons in the SARG protocol of 0.2 [photon/pulse]). For all the properties, the longer the communication distance, the higher is the photon loss rate due to the fiber, and the frequency of attacks by the adversary increases, and thus the mutual information amount (leaked information amount) related to the secret key increases. Moreover, the adversary performs the most advantageous attack in accordance with the communication distance between Alice and Bob. For short distances, storage attacks (BB84 protocol) are most advantageous attack; for a specific distance with boundaries, the intercept-resend with unambiguous discrimination attack (SARG protocol) is the most advantageous attack. Boundary distance varies in accordance with the parameters and protocols of the implemented equipment and the value of the usage rate a. Therefore, the characteristics of the protocol (c) of the present invention make use of the advantages of the BB84 protocol (a) and the SARG protocol (b). The SARG protocol is the same as the protocol of the present invention taking a=0, while the BB84 protocol is the same as the protocol of the present invention taking a=1.

When a storage attack is made on a protocol other than the BB84 protocol, the mutual information amount (leaked information amount) related to the secret key of the adversary will not be 1. This is because the classical information of X sent by Alice has two mutually non-orthogonal quantum states, and the adversary cannot completely identify either of the two states.

Conversely, when an intercept-resend with unambiguous discrimination attack is made, the amount of information leaked to the adversary for the same communication distance is less in the protocol scheme of the present invention than in the SARG protocol because the average number of photons per pulse is restricted than the SARG protocol to maintain the secret key generation efficiency per pulse the same as that of the SARG protocol. As a result, the generation probability of multiple photons is smaller than that of the SARG protocol.

Figure 4:
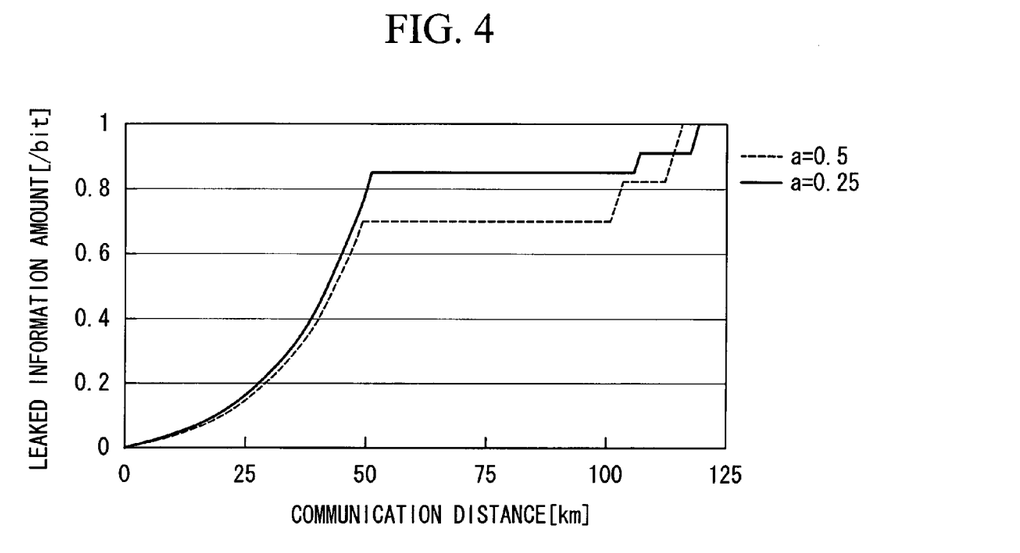
FIG. 4 shows the characteristics comparing robustness to photon number splitting attacks when the usage rate a of the BB84 protocol and the SARG protocol is varied.

FIG. 4 is a diagram showing the characteristics comparing the robustness to photon number splitting attack when the usage rate a is varied. That is, this figure is a graph expressing the robustness to photon number splitting attack when (a) a=0.5 and (b) a=0.25 are assumed in the present invention. The horizontal axis in the figure expresses the communication distance [km] between Alice and Bob; the vertical axis expresses the mutual information amount [/bit] related to the secret key that the adversary possesses (that is, leaked information amount). The parameters of the graph are (a) a=0.5 and (b) a=0.25. The attenuation rate of the optical fiber for communication between Alice and Bob is taken as 0.25 [dB/km], the average number of photons per pulse in the BB84 protocol is taken as 0.1 [photon/pulse] (equivalent to the average number of photons in the SARG protocol of 0.2 [photon/pulse]). The longer the communication distance, the higher is the attenuation due to the fiber, and the frequency of attacks by the adversary increases, and thus the mutual information amount (leaked information amount) related to the secret key increases.

When a storage attack is made, the higher the frequency of output "0" by the a-random generator, the higher is the mutual information amount (leaked information amount) related to the secret key of the adversary. Conversely, when an intercept-resend with unambiguous discrimination attack is made, the higher the frequency of output of "0" by the a-random generator, the lower is the average number of photons per pulse, and the mutual information amount (leaked information amount) related to the secret key obtained by the adversary for the same communication distance is lesser.

Figure 5:
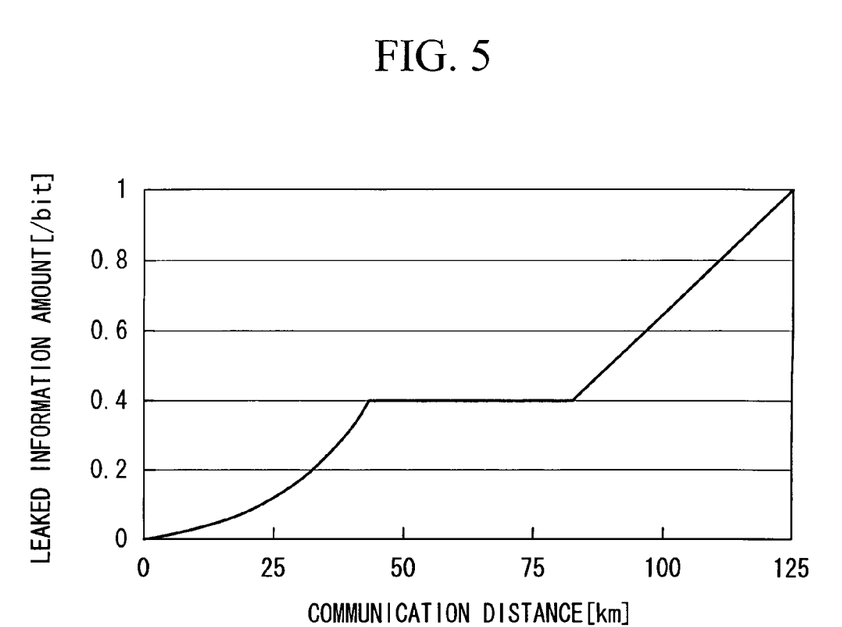
FIG. 5 shows the characteristics that express the robustness relationship when the usage rate a is varied such that the protocol becomes most robust against photon number splitting attacks.

FIG. 5 is a diagram showing the characteristics that express the robustness relationship when the usage rate a is varied such that the protocol becomes most robust against photon number splitting attacks. That is, this figure is a graph that expresses the robustness when the usage rate a is changed to the optimum value in accordance with the communication distance between Alice and Bob in order to restrict the amount of leaked information to a minimum when the adversary makes a photon number splitting attack. The horizontal axis in the figure expresses the communication distance [km] between Alice and Bob; the vertical axis expresses the mutual information amount [/bit] related to the secret key that the adversary possesses (that is, leaked information amount). When the mutual information amount per bit becomes 1, secret key cannot be generated securely. In contrast, if the mutual information amount per bit is less than 1, even if the mutual information amount is very close to the value of 1, secure secret key (secret key with mutual information amount infinitely close to 0) can be generated using classical communication technology called privacy amplification, proposed in non-patent document 3. The attenuation rate of the optical fiber for communication between Alice and Bob is taken as 0.25 [dB/km], the average number of photons per pulse in the BB84 protocol is taken as 0.1 [photon/pulse] (equivalent to the average number of photons in the SARG protocol of 0.2 [photon/pulse]).

For close distances, the usage rate a is set to 0. For distances longer than a specific distance, the usage rate a is increased in accordance with an increase in distance, and the usage rate a eventually approaches a value close to 1. As a result, the secure limits for communication distance by the protocol of the present invention can be extended to 125 km. The secure limit of communication distance in the BB84 protocol is 50 km; while the secure limit of communication distance in the SARG protocol is 100 km.

Figure 6:
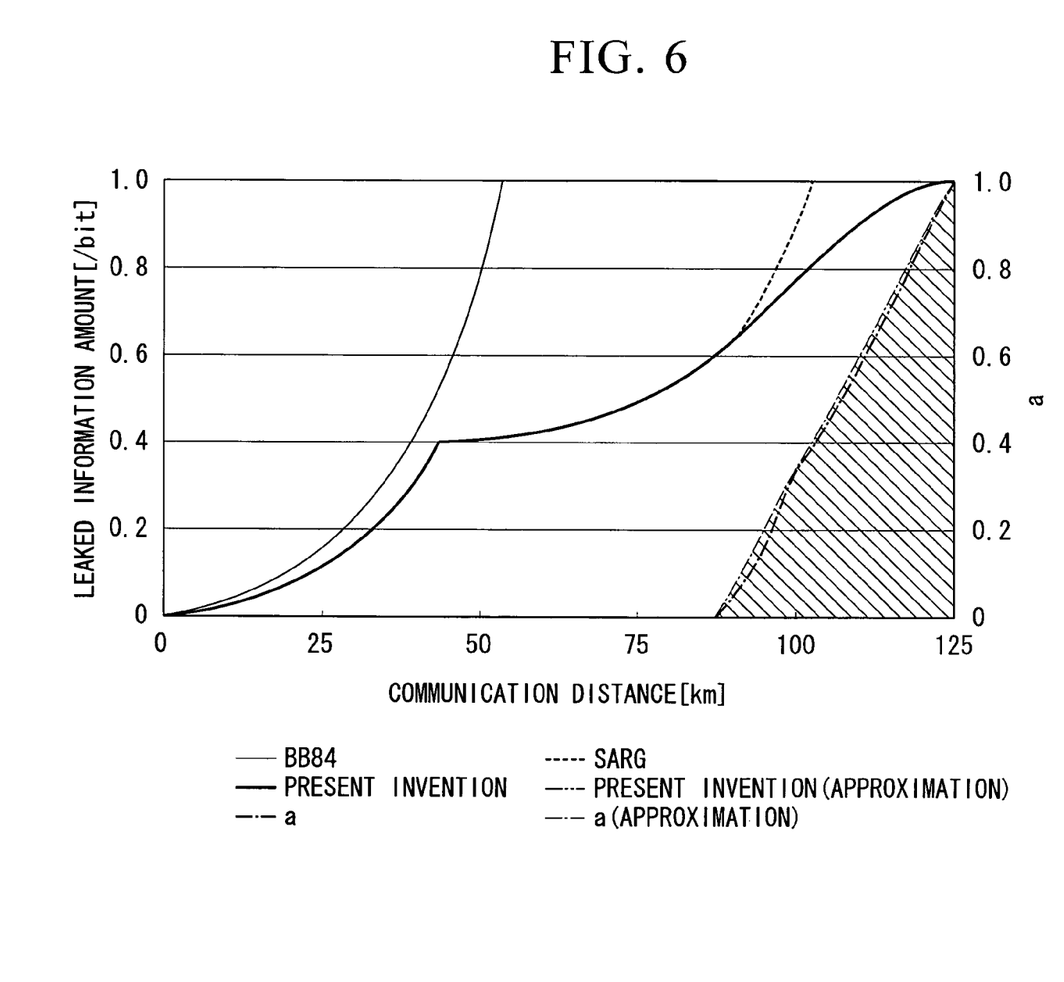
FIG. 6 shows the relationship between communication distance and leaked information amount related to the BB84 protocol and the SARG protocol, the relationship between communication distance and leaked information amount when the usage rate a in the protocol of the present invention is varied in accordance with the communication distance to obtain the optimum value, and the characteristics of the optimum value of the usage rate a and its linear approximation over a communication distance greater than 87.5 km in the protocol of the present invention.

FIG. 6 shows a graph that expresses: the relationship between communication distance and leaked information amount for the BB84 protocol and the SARG protocol same as in FIG. 3; the relationship between the communication distance and leaked information amount when the usage rate a in the protocol of the present invention is varied to the optimum value in accordance with the communication distance same as in FIG. 5; and the optimum value of the usage rate a and the straight line approximation thereof in communication exceeding 87.5 km in the protocol of the present invention. It is noted that the graph that shows the relationship between the communication distance and the leaked information amount in FIG. 6 indicates a much higher accuracy with an increase in the number of plotted points compared to FIGS. 3 and 5. The horizontal axis in FIG. 6 expresses the communication distance [km] between Alice and Bob, while the vertical axis expresses the leaked information amount [/bit] and the usage rate a.

In FIG. 6, when the average number of photons in the pulses of weak coherent light used in the BB84 protocol is taken as 0.1 [photon/pulse] (equivalent to the average number of photons in the SARG protocol of 0.2 [photon/pulse]), and the communication distance is L (>87.5 km), the curve of the usage rate a can be approximated by the straight line $(L-87.5)/(125-87.5)$. The average number of photons at this stage is $0.2/(1+a)$. In communications exceeding 87.5 km, the key generation efficiency increases higher than in the existing protocols. That is, in communications exceeding 87.5 km, the leaked information amount can be made smaller than that of the BB84 protocol and the SARG protocol; therefore, the communication efficiency increases proportionately, and the time until the key is shared between Alice and Bob can be shortened compared to the BB84 protocol and the SARG protocol. Moreover, secure communications can be realized in communications exceeding 100 km, which was not possible until now.

The quantum key distribution protocol of the present invention does not need to use optimum values of the usage rate a or values from straight-line approximations shown in FIG. 6; the values of usage rate a in the range indicated by oblique lines in FIG. 6 may be used.

More specifically, when the average number of photons used in the BB84 protocol is μ (equivalent to the average number of photons 2μ in the SARG protocol), the usage rate a of the BB84 protocol and the SARG protocol in the quantum key distribution protocol of the present invention is provided as $a \leq (L-m)/(M-m)$ (however, values of usage rate a other than 0 and 1). Here, m is the minimum distance at which the mutual information amount that could be obtained by an eavesdropper by using the present invention is reduced than that when the BB84 protocol or the SARG protocol is used independently, assuming that the average number of photons per pulse of weak coherent light is constant. Moreover, M is the maximum distance at which the mutual information amount that could be obtained by an eavesdropper can be made less than 1 by the present invention. Furthermore, L is the communication distance mentioned above, and is a value between distance m and distance M. The average number of photons at this stage is provided as $\mu \times 0.2/(1+a)$. Especially, when the average number of photons per pulse of weak coherent light is 0.1 [photon/pulse], M=125 km and m=87.5 km, and the usage rate a is provided as $a \leq (L-87.5)/(125-87.5)$ (however, a is a value other than 0 and 1).

Figure 7:
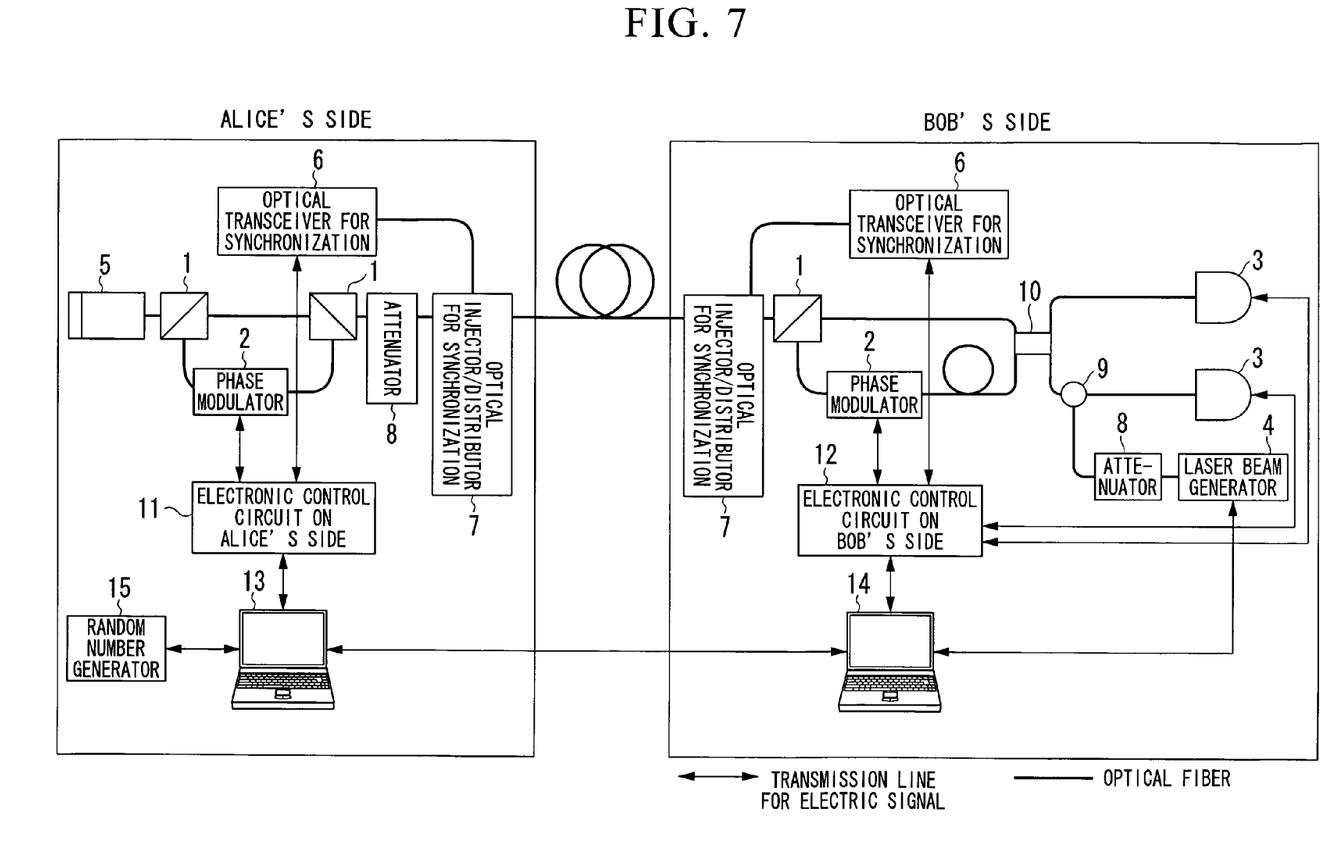
FIG. 7 shows the block diagram of the configuration of a quantum key distribution system for realizing the quantum key distribution protocol in the embodiment of the present invention.
Figure 8:
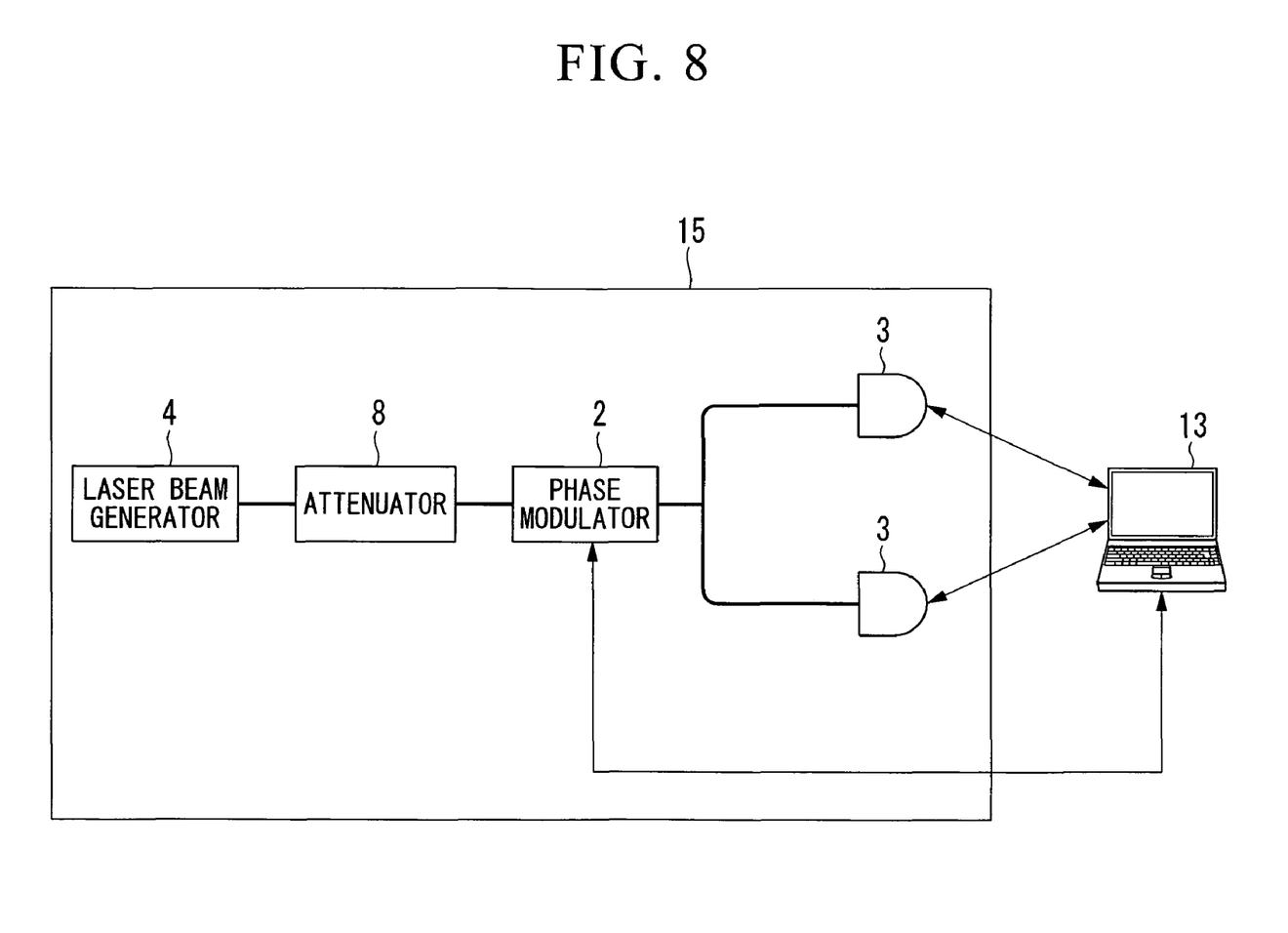
FIG. 8 shows the block diagram of the detailed configuration of a random number generator used in the embodiment of the present invention.

FIG. 7 shows the block diagram of the configuration of a quantum key distribution system for realizing the quantum key distribution protocol of the present invention. The quantum key distribution system of the present invention includes a random number generator 15 (equivalent to the a-random number generator mentioned above) added on the side of Alice to the conventional quantum key distribution system. FIG. 8 is a block diagram that shows the detailed configuration of the random number generator 15 of the present invention. In FIGS. 7 and 8, the same structural elements are affixed with the same reference numerals.

In FIG. 7, the quantum key distribution system is divided into Alice's side and Bob's side. The configuration on Alice's side includes two beam splitters 1, a phase modulator 2, a Faraday mirror 5, an optical transceiver for synchronization 6, an optical injector/distributor for synchronization 7, an attenuator 8, an electronic control circuit on the Alice's side 11, a computer on the Alice's side 13, and a random number generator 15.

The configuration on Bob's side includes a beam splitter 1, a phase modulator 2, two balanced photodiodes 3, a laser beam generator 4, an optical transceiver for synchronization 6, an optical injector/distributor for synchronization 7, an attenuator 8, an optical circulator 9, a core coupler 10, an electronic control circuit on Bob's side 12, and a computer on Bob's side 14. In FIG. 7, the transmission lines connecting the various structural elements include electric signal transmission lines indicated by fine lines and optical fibers indicated by thick lines.

The operation of the quantum key distribution system shown in FIG. 7 is described here.

On Alice's side, photons are sent to Bob's side by the Faraday mirror 5. In this case, the state of the photons in the fiber is controlled by the two beam splitters 1, the phase modulator 2, and the attenuator 8.

On the other hand, on Bob's side, the computer on Bob's side 14 controls the laser beam generator 4, and single photons are generated by the laser beam generator 4 and the attenuator 8. The photons are passed through the fiber through the optical circulator 9, the core coupler 10, and the beam splitter 1. The electronic control circuit on Bob's side 12 controls the phase modulator 2 and sets the base used for observing the photons. Furthermore, the two balanced photodiodes 3 observes the photons, and the electronic control circuit on Bob's side 12 performs signal processing based on the results obtained by the observation.

The synchronization related to communications of these photons between Alice's side and Bob's side is performed by the optical transceiver for synchronization 6 and the optical injector/distributor for synchronization 7, each installed on Alice's side and Bob's side, under the control of the electronic control circuit on Alice's side 11 and the electronic control circuit on Bob's side 12.

The computer on Alice's side 13 and the computer on Bob's side 14 control various units through the electronic control circuit on Alice's side 11 and the electronic control circuit on Bob's side 12 respectively. The random numbers generated by the random number generator 15 are used by the computer on Alice's side 13 to execute the algorithm of the present invention mentioned above.

Moreover, in FIG. 8, the random number generator 15 used in the present invention includes a phase modulator 2, two balanced photodiodes 3, a laser beam generator 4, and an attenuator 8, and is connected to the computer on Alice's side 13.

The operation of the random number generator 15 shown in FIG. 8 is described here. The laser beam generator 4 and the attenuator 8 generate single photons. The computer on Alice's side 13 controls the phase modulator 2 and adjusts the phase of the single photons, and thus the photons are observed in one of the two balanced photodiodes 3. The computer on Alice's side 13 matches the information "0" if photons are observed in one of the balanced photodiodes 3 (for instance, the upper one shown in the figure), and matches the information "1" if photons are observed in the other balanced photodiode 3 (for instance, the lower one shown in the figure). If these operations are repeated, a progression from 0 and 1 is formed, and this progression is guaranteed as complete random numbers by quantum mechanical properties. The percentage of 0 and 1 can be freely adjusted by the phase set by the phase modulator 2.

Embodiments of the present invention have been described above referring to the drawings, but these are meant only for illustrating the present invention, which is evidently not limited to only these embodiments. Consequently, various changes such as additions, omissions, substitutions, and so on may be effected to the present invention without departing from the spirit and scope of the present invention.

INDUSTRIAL APPLICABILITY

The quantum key distribution protocol of the present invention can use quantum-based communication equipment and random number generator in existing systems, and it can be realized by simply changing only communication data exchanged in classical systems and the key sifting process. Thus, it can be used immediately in various communication fields. Since most of the current quantum key distribution systems are realized by using weak coherent light, by applying the quantum key distribution protocol of the present invention, the security of the system can be further enhanced; thus, its utility value in the infrastructure of the communication field is very high.

The invention claimed is:

1. A quantum key distribution protocol used in a quantum key distribution system implemented by using a pulse of weak coherent light, comprising:
    determining a ratio of usage of one of two kinds of existing protocols to usage of the other of the two kinds of existing protocols in accordance with a communication distance between a sender and a receiver of the weak coherent light; and
    switching a protocol to be used between the two kinds of existing protocols in accordance with the ratio,
    wherein the two kinds of existing protocols are the BB84 protocol vulnerable to storage attacks, and the SARG protocol vulnerable to intercept-resend with unambiguous discrimination attacks, and
    if an average number of photons in the pulse of the weak coherent light when the BB84 protocol is used independently is taken as $\mu$, and if an average number of photons in the pulse of the weak coherent light when the SARG protocol is used independently is taken as $2\mu$, and if the minimum distance at which a mutual information amount that can be acquired by an eavesdropper reduces more than when the BB84 protocol and the SARG protocol are each used independently is taken as m, and if the maximum distance at which the mutual information amount that can be acquired by the eavesdropper becomes less than 1 when the protocol to be used is switched between the two kinds of existing protocols in accordance with the ratio is taken as M, and if the communication distance is taken as L, L being a value between m and M, the ratio a of usage of the BB84 protocol to usage of the SARG protocol is determined as $a \leq (L-m)/(M-m)$, a being a value other than 0 and 1, and the average number of photons is determined as $\mu \times 2/(1+a)$.

2. The quantum key distribution protocol as recited in claim 1, wherein if the average number of photons in the pulse of the weak coherent light when the BB84 protocol is independently used is 0.1 [photon/pulse], and if the average number of photons in the pulse of the weak coherent light when the SARG protocol is independently used is 0.2 [photon/pulse], and if M=125 km and m=87.5 km, the ratio a is determined as $a \leq (L-87.5)/(125-87.5)$, a being a value other than 0 and 1 and L being a value between 87.5 km and 125 km, and the average number of photons is determined as $0.2/(1+a)$.

3. A quantum key distribution protocol used in a quantum key distribution system implemented by using a pulse of weak coherent light, comprising:
   determining a ratio of usage of one of two kinds of existing protocols to usage of the other of the two kinds of existing protocols in accordance with a communication distance between a sender and a receiver of the weak coherent light; and
   switching a protocol to be used between the two kinds of existing protocols in accordance with the ratio,
   wherein the two kinds of existing protocols are the BB84 protocol vulnerable to storage attacks and the SARG protocol vulnerable to intercept-resend with unambiguous discrimination attacks, and
   if an average number of photons in the pulse of the weak coherent light when the BB84 protocol is used independently is taken as $\mu$, and if an average number of photons in the pulse of the weak coherent light when the SARG protocol is used independently is taken as $2\mu$, and if the minimum distance at which a mutual information amount that can be acquired by an eavesdropper reduces more than when the BB84 protocol and the SARG protocol are each used independently is taken as m, and if the maximum distance at which the mutual information amount that can be acquired by the eavesdropper becomes less than 1 when the protocol to be used is switched between the two kinds of existing protocols in accordance with the ratio is taken as M, and if the maximum distance at which the mutual information amount that can be acquired by the eavesdropper becomes less than 1 when the BB84 protocol and the SARG protocol are each used independently is taken as n, and if the communication distance is taken as L, L being a value between n and M, the ratio a of usage of the BB84 protocol to usage of the SARG protocol is determined as $a \leq (L-m)/(M-m)$, a being a value other than 0 and 1, and the average number of photons is determined as $\mu \times 2/(1+a)$.

4. The quantum key distribution protocol as recited in claim 3, wherein if the average number of photons in the pulse of the weak coherent light when the BB84 protocol is independently used is 0.1[photon/pulse], and if the average number of photons in the pulse of the weak coherent light when the SARG protocol is independently used is 0.2[photon/pulse], and if M=125 km, m=87.5 km, and n=100 km, the ratio a is determined as $a \leq (L-87.5)/(125-87.5)$, a being a value other than 0 and 1 and L being a value between 100 and 125 km, and the average number of photons is determined as $0.2/(1+a)$.

5. The quantum key distribution protocol as recited in claim 1, wherein the two kinds of existing protocols use four quantum states throughout a range that is greater than zero and is less than M.

6. The quantum key distribution protocol as recited in claim 3, wherein the two kinds of existing protocols use four quantum states throughout a range that is greater than zero and is less than M.

7. The quantum key distribution protocol as recited in claim 1, wherein an average number of photons per pulse is restricted than that of the SARG protocol.

8. The quantum key distribution protocol as recited in claim 3, wherein an average number of photons per pulse is restricted than that of the SARG protocol.

9. The quantum key distribution protocol as recited in claim 1, wherein
   when the communication distance is less than or equal to m, the SARG protocol is always used, m being the minimum distance at which a mutual information amount that can be acquired by an eavesdropper reduces more than when the BB84 protocol and the SARG protocol are each used independently, and
   when the communication distance is greater than m, the BB84 protocol or the SARG protocol is used in accordance with the ratio.

10. The quantum key distribution protocol as recited in claim 3, wherein
    when the communication distance is less than or equal to m, the SARG protocol is always used, m being the minimum distance at which a mutual information amount that can be acquired by an eavesdropper reduces more than when the BB84 protocol and the SARG protocol are each used independently, and
    when the communication distance is greater than m, the BB84 protocol or the SARG protocol is used in accordance with the ratio.

* * * * *